United States Patent
Han et al.

(10) Patent No.: US 12,468,060 B1
(45) Date of Patent: Nov. 11, 2025

(54) METHOD FOR POSITIONING AND PREDICTING CONCEALED OREBODY BASED ON PARALLEL DOUBLE-TUNNEL TRANSIENT ELECTROMAGNETIC EXPLORATION

(71) Applicant: Kunming University of Science and Technology, Kunming (CN)

(72) Inventors: Runsheng Han, Kunming (CN); Wenyao Li, Kunming (CN); Jianbiao Wu, Kunming (CN); Yan Zhang, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 0 days.

(21) Appl. No.: 18/948,766

(22) Filed: Nov. 15, 2024

(30) Foreign Application Priority Data

Jun. 18, 2024 (CN) .......................... 202410781104.4

(51) Int. Cl.
*G01V 3/08* (2006.01)
(52) U.S. Cl.
CPC ........ *G01V 3/083* (2013.01); *G01V 2003/084* (2013.01); *G01V 2003/085* (2013.01); *G01V 2003/086* (2013.01)
(58) Field of Classification Search
CPC ............. G01V 3/083; G01V 2003/084; G01V 2003/085; G01V 2003/086
See application file for complete search history.

(56) References Cited

U.S. PATENT DOCUMENTS 11,187,824 B2 * 11/2021 Xue .......................... G01V 3/38

FOREIGN PATENT DOCUMENTS

| CN | 113031091 B | * | 5/2022 | ............... G01V 7/00 |
| CN | 115016015 B | * | 8/2023 | ............... G01V 3/38 |

OTHER PUBLICATIONS

CN-113031091-B_translated (Year: 2022).*
CN-115016015-B_translated (Year: 2023).*

* cited by examiner

*Primary Examiner* — Lisa M Caputo
*Assistant Examiner* — Michael J Singletary
(74) *Attorney, Agent, or Firm* — Thomas Horstemeyer, LLP (57) ABSTRACT

Provided is a method for positioning and predicting concealed orebody based on parallel double-tunnel transient electromagnetic exploration, and belongs to the applied geophysics exploration technology. The method can locate and predict concealed orebodies with low resistivity around the tunnel in a full spatial domain based on a parallel double-tunnel transient electromagnetic method. The implementation of the method mainly includes measuring an electrical parameter, observing a tunnel transient electromagnet, calculating an apparent resistivity, determining an upper limit of an apparent resistivity abnormity, delineating the apparent resistivity abnormity and positioning and predicting concealed orebodies. The method can effectively solve the double-solution problem of positioning concealed orebodies in the full spatial domain of the tunnel.

1 Claim, 6 Drawing Sheets

METHOD FOR POSITIONING AND PREDICTING CONCEALED OREBODY BASED ON PARALLEL DOUBLE-TUNNEL TRANSIENT ELECTROMAGNETIC EXPLORATION

CROSS-REFERENCE TO RELATED APPLICATION

This patent application claims the benefit and priority of Chinese Patent Application No. 202410781104.4 filed with the China National Intellectual Property Administration on Jun. 18, 2024, the disclosure of which is incorporated by reference herein in its entirety as part of the present application.

TECHNICAL FIELD

The present disclosure relates to a method for positioning and predicting concealed orebody based on parallel double-tunnel transient electromagnetic exploration, which belongs to the field of mineral resources exploration.

BACKGROUND

The basic principle of a Transient Electromagnetic Method (TEM) is that the medium will produce an eddy current under the excitation of the primary current pulse field. During the interruption of the pulse, the eddy current will not disappear immediately, thereby forming a secondary magnetic field in the surrounding space that decays over time. The attenuation law of the secondary magnetic field over time mainly depends on the conductivity, the volume scale and the buried depth of the medium (an abnormal body), as well as the form and the frequency of emission current. Therefore, the spatial distribution of abnormal bodies can be understood by measuring and analyzing the relevant information of the secondary field through a receiving coil or a grounding electrode, so as to achieve the purpose of predicting underground target bodies. This method is widely used in the fields of resources, energy, hydrogeology, engineering geology, disaster geology, environmental geological exploration, military exploration, etc. However, this method is mainly used in the detection of the surface semi-spatial domain, and tunnel detection is only used in the advanced detection of a single tunnel at present. In the detection of concealed orebodies, when the transient electromagnetic method is used to detect in the surface, the abnormal source will only be below the surface, but in the application of a tunnel in the whole spatial domain, the abnormal source may be under the tunnel or above the tunnel. That is, there are symmetric double solutions, so that it is difficult to determine the exact location of the abnormal source.

SUMMARY

The present disclosure provides a method for positioning and predicting a concealed orebody based on parallel double-tunnel transient electromagnetic exploration, which solves the problem that it is difficult to accurately position and predict the ore body due to the double-solution performance of the transient electromagnetic method of the tunnel, so as to accurately position and predict the concealed orebody in the whole spatial domain of the tunnel.

The specific operation steps of the method of the present disclosure are as follows.

Step (1), Measurement of Electrical Parameters

Electrical parameters of ores and ore-hosted rocks in a mining area are measured, a geometric mean of a resistivity is calculated, and it is determined that an ore body has a low-resistance.

Step (2), Observation of a Tunnel Transient Electromagnet.

Figure 1:
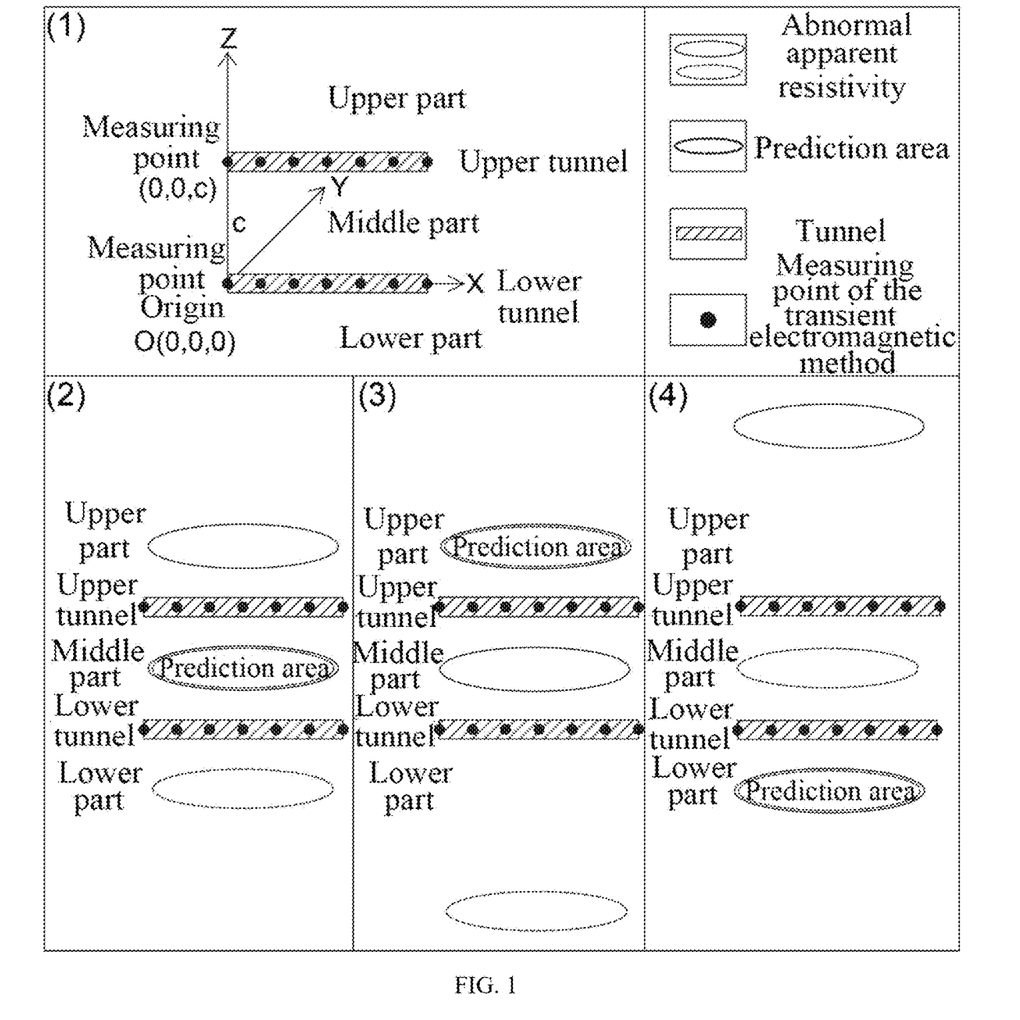
FIG. 1 is a schematic diagram of determining the prediction area using a method of positioning and predicting concealed orebody based on parallel double-tunnel transient electromagnetic exploration, where (1) is a schematic diagram of a vertical and parallel double-tunnel coordinate system, (2) is a schematic diagram of the situation that the prediction area is located in the middle part, (3) is a schematic diagram of the situation that the prediction area is located in the upper part, and (4) is a schematic diagram of the situation that the prediction area is located in the lower part.

A forward direction of a tunnel is defined as a positive direction of an X-axis, an upward direction normal to the X-axis is defined as a positive direction of a Z-axis, and a direction normal to the X-axis and normal to the Z-axis is defined as a positive direction of a Y-axis according to a right-hand rule. When two tunnels are parallel upper tunnel and lower tunnel, it is assumed that the distance between the two tunnels is c, and a first measuring point of the lower tunnel is specified as an origin O with a coordinate of (0, 0, 0). A coordinate of a first measuring point of the upper tunnel is specified as (0,0,c) (as shown in FIG. 1), where c is between 0 and 500 m. Tunnel transient electromagnetic measuring points are arranged along the tunnel for measurement, where a distance between the measuring points is 20 m. Measurement is carried out by using a tape measure and a plan of a middle section of the tunnel for positioning the tunnel transient electromagnetic measuring points. Measurement is carried out by using a coplanar equivalent counter-flux device to obtain data about voltage V(t), current I and time t, where the number of turns of a transmitting coil is 6, a radius of the transmitting coil is 0.42 m, power supply current is 100 A, sampling time is 0.17-10 ms, the number of superposition times is 30, and a detection distance is 500 m.

Step (3), Calculation of an Apparent Resistivity.

An apparent resistivity is calculated by using following formula:

$$\rho_\tau = 0.00632 \times L^{\frac{4}{3}} \times q^{\frac{2}{3}} \times [V(t)/I]^{-\frac{2}{3}} \times t^{-\frac{5}{3}} \tag{1}$$

where L is a side length of the transmitting coil in unit of m;
q is an effective area of a receiving coil (an area of a single-turn coil multiplied by the number of turns) in unit of $m^2$;
V(t) is an electric potential observation value in unit of μV;
V(t)/I is a normalized electric potential observation value in unit of μv/A;
t is an observation time in unit of ms;
$\rho_\tau$ is an apparent resistivity in unit of Ω·m;
an inversion calculation of a visual depth is as follows:

$$h_\tau = 4/(\mu_0 S_\tau) \times \left(V(t)/\frac{dV}{dt} - t/4\right) \tag{2}$$

$$S_\tau = \frac{16\pi^{1/3}}{(3 Mq)^{1/3} \mu_0^{4/3}} \times (V(t))^{5/3} / \left(\frac{dV}{dt}\right)^{4/3} \tag{3}$$

where $\mu_0 = 4\pi \times 10^{-7}$ H/m;
$S_\tau$ is a longitudinal conductance in unit of 1/Ω;
V(t)/I is an electric potential observation value in unit of μV;
dV/dt is a derivative of an observation electric potential in unit of V/s;
t is an observation time in unit of s;
M is a transmitting magnetic moment in unit of $m^2A$;

q is an effective area of the receiving coil (an area of a single-turn coil multiplied by the number of turns) in unit of $m^2$;

$h_\tau$ is the visual depth in unit of m;

the apparent resistivity is obtained according to the calculation result of Formula (1), then the visual depth is calculated and obtained according to Formula (2) and Formula (3), and a cross-sectional view of resistivity-visual depth distribution is drawn according to the apparent resistivity and the visual depth.

Step (4), Determination of an Upper Limit of an Apparent Resistivity Abnormity.

Through statistics of normal distribution of the apparent resistivity in tunnel transient electromagnetic measurement, a median and a standard deviation of the apparent resistivity are obtained, where the upper limit of the apparent resistivity abnormity is equal to the median (or average) of the apparent resistivity minus 1 to 3 times a standard deviation.

Step (5), Delineation of the Apparent Resistivity Abnormity.

According to the upper limit of the apparent resistivity abnormity determined in step (4), the apparent resistivity abnormities of the two tunnels are delineated; where there are two areas with the apparent resistivity abnormity, which are axially symmetrically distributed with the tunnel transient electromagnetic measuring points.

Step (6), Positioning and Predicting Concealed Orebody.

For the apparent resistivity abnormities delineated in step (5), a distribution map of four apparent resistivity abnormities of the two tunnels is formed in X-O-Z plane according to a parallel correspondence relationship between vertical planes of the two tunnels. Coincidences of the four apparent resistivity abnormities of the two tunnels in the plane are compared. In a case that two apparent resistivity abnormities of the two tunnels overlap in a certain direction, it can be determined that a prediction area is within overlapping area, which characteristics are shown in FIG. 1, where a part above the upper tunnel is defined as an upper part, a part below the lower tunnel is defined as a lower part, and a part between the two tunnels is defined as a middle part. In the X-O-Z plane, when the apparent resistivity abnormities of the two tunnels overlap in the upper part, the prediction area is located in the upper part; when the apparent resistivity abnormity of the two tunnels overlap in the lower part, the prediction area is located in the lower part; and when the apparent resistivity abnormities of the two tunnels overlap in the middle part, the prediction area is located in the middle part.

The advantages and the technical effects of the present disclosure are as follows.

1. The method of the present disclosure has the advantages of portability, rapidity, high efficiency, low cost, and capability of overcoming the problem of multiple solutions for predicting and positioning orebody in tunnels.

2. The application of the method according to the present disclosure in several copper, lead and zinc mining areas has achieved good ore-prospecting results.

DETAILED DESCRIPTION OF THE EMBODIMENTS

The present disclosure will be further described in detail with reference to examples hereinafter, but the scope of protection of the present disclosure is not limited to the above contents, and the methods in the embodiments are all conventional methods unless otherwise specified.

Embodiment 1: The method for positioning and predicting concealed orebody based on parallel double-tunnel transient electromagnetic exploration is applied in a lead-zinc mineral deposit tunnel in northeast Yunnan, which has good ore-prospecting results, and includes steps (1)-(6).

In step (1), measurement of electrical parameters is carried out as follows.

163 specimens were collected, and the identification results showed that: there are 85 lead-zinc ores, 25 limestones and 53 dolomites. The statistical results of resistivity measurement showed that the geometric average resistivity of lead-zinc ores was 10 Ω·m, the geometric average resistivity of the ore-hosting limestone was 30218 Ω·m, and the geometric average resistivity of the ore-hosting dolomite was 17403 Ω·m. Compared with surrounding rocks, lead-zinc orebody are low-resistance elements, which have the electrical premise to carry out measurement using a tunnel transient electromagnetic method.

In step (2), observation of a tunnel transient electromagnet is carried out as follows.

Figure 2:
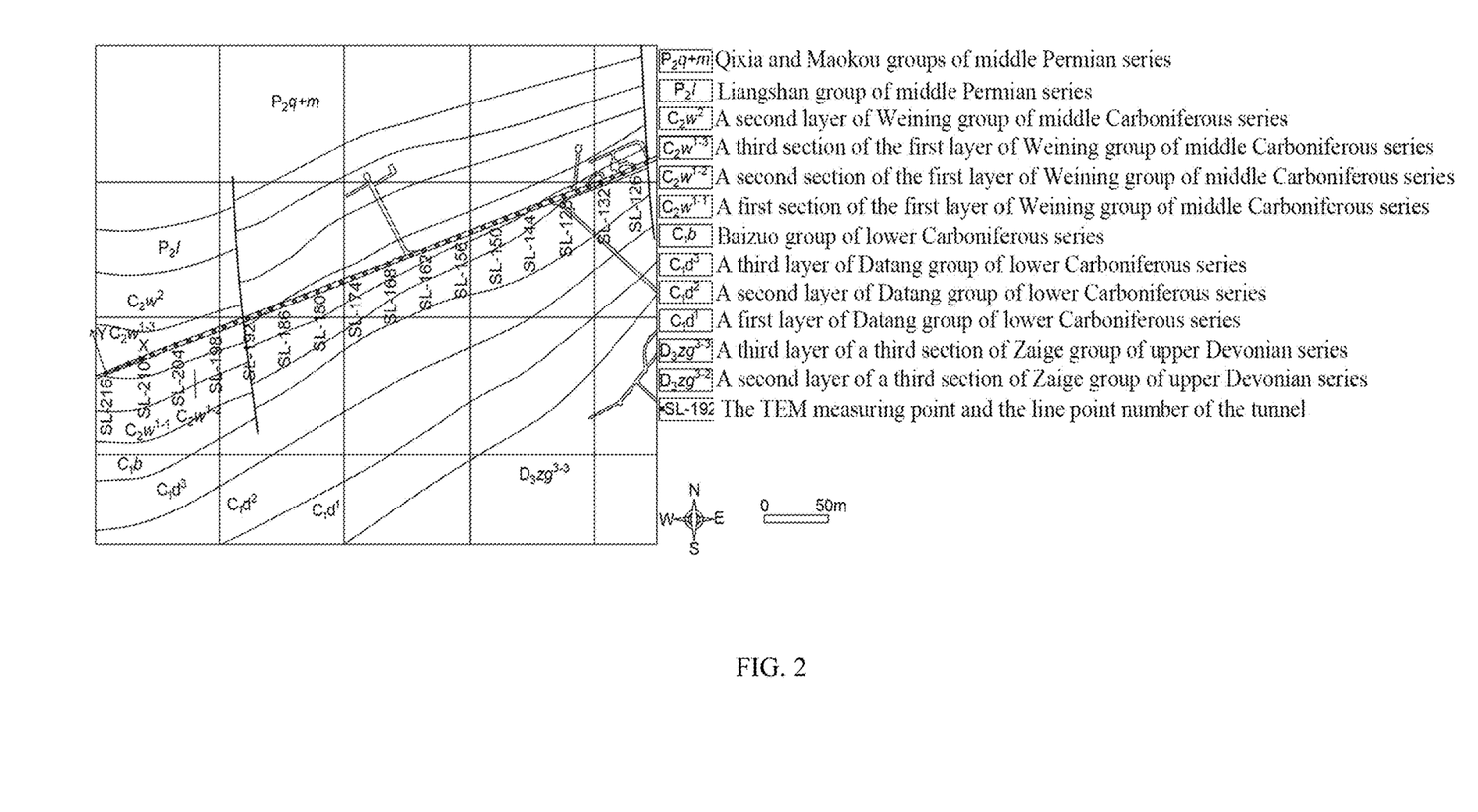
FIG. 2 is a plan of a measuring point in a middle section of 670 m of a lead-zinc deposit in northeast Yunnan.
Figure 3:
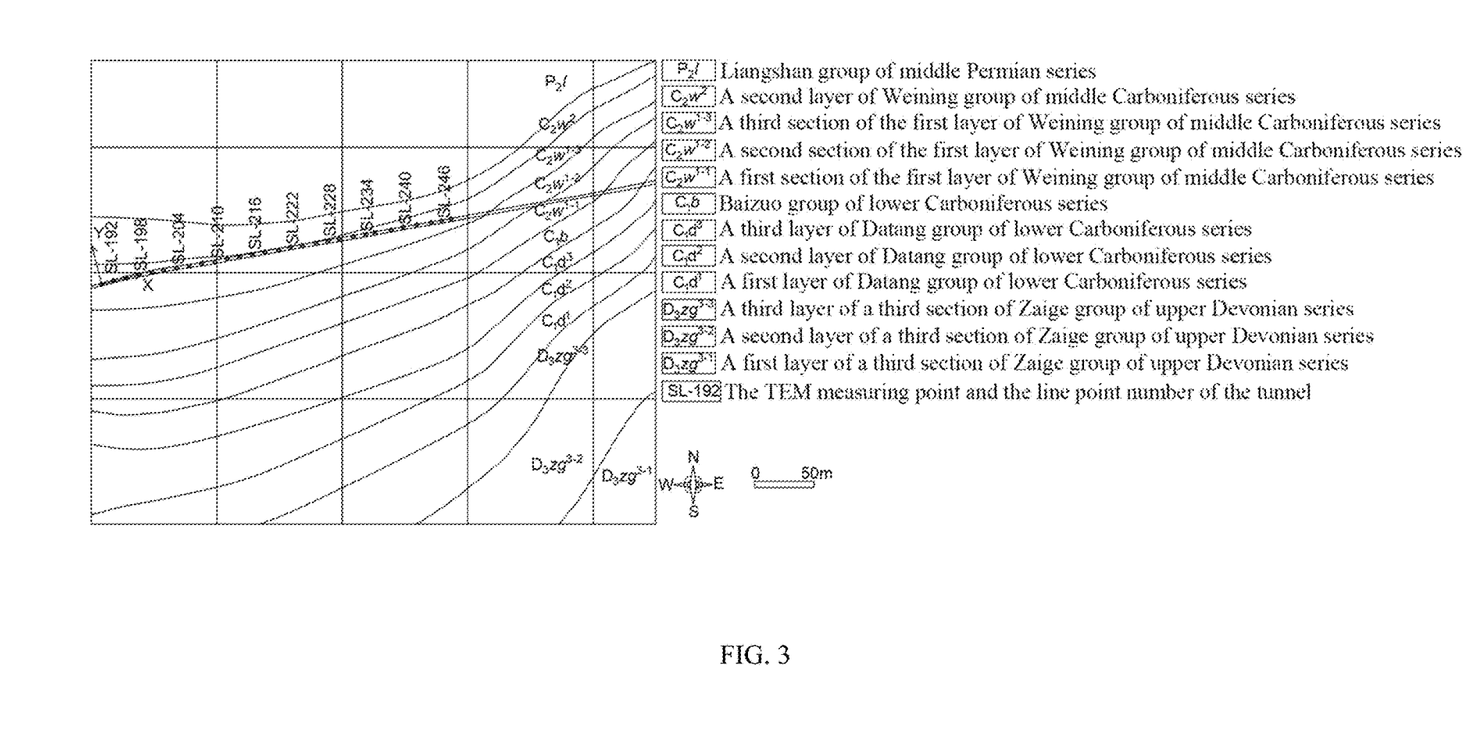
FIG. 3 is a plan of a measuring point in a middle section of 610 m of a lead-zinc mineral deposit in northeast Yunnan.

The method is applied to two tunnels corresponding to each other up and down in the middle sections of 670 m and 610 m of a lead-zinc deposit in northeast Yunnan (FIGS. 2-3). The transient electromagnetic measuring points of the tunnel are arranged along the tunnel. Measurement is carried out by using a tape measure in conjunction with a plan of a middle section of the tunnel for positioning the measuring point, in which a distance between points is 20 m. Measurement is carried out by using a coplanar equivalent counter-flux device to obtain the data about voltage V(t), current I and time t, where the number of turns of a transmitting coil is 6, the radius of the transmitting coil is 0.42 m, and the side length of the equivalent square transmitting coil is 0.753 m; the power supply current is 100 A, the equivalent single-turn power supply current is 600 A, the sampling time is 0.17-10 ms, and the number of superposition times is 30. In order to overcome the iron interference, the receiving coil is placed 100 cm above the two tracks and 200 cm away from the iron pipe for data acquisition.

In step (3), an apparent resistivity is calculated as follows:

$$\rho_\tau = 0.00632 \times L^{\frac{4}{3}} \times q^{\frac{2}{3}} \times [V(t)/I]^{-\frac{2}{3}} \times t^{-\frac{5}{3}}; \quad (1)$$

the visual depth is calculated by using following formulas:

$$h_\tau = 4/(\mu_0 S_\tau) \times \left( V(t)/\frac{dV}{dt} - t/4 \right) \quad (2)$$

$$S_\tau = \frac{16\pi^{1/3}}{(3Mq)^{1/3}\mu_0^{4/3}} \times (V(t))^{5/3} / \left(\frac{dV}{dt}\right)^{4/3} \quad (3)$$

An apparent resistivity is obtained according to the Formula (1), then a visual depth is calculated and obtained according to Formula (2) and Formula (3), and a profile view of resistivity-visual depth distribution is drawn according to the apparent resistivity and the visual depth.

In step (4), determination of an upper limit of an abnormity is carried out as follows.

Figure 4:
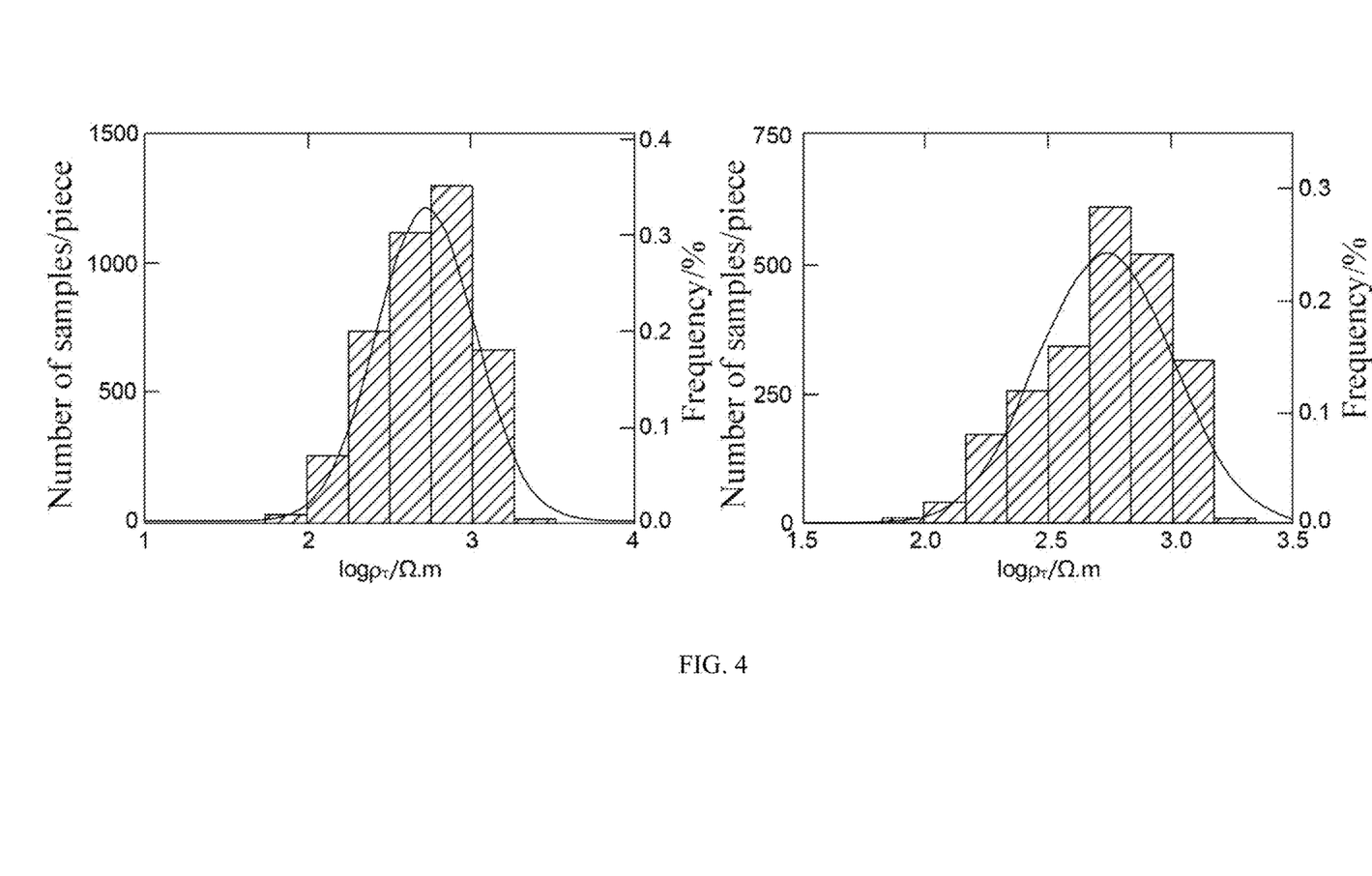
FIG. 4 is a histogram of the normal distribution of an apparent resistivity at middle sections of 670 m and 610 m of a lead-zinc mineral deposit in northeast Yunnan, in which the middle section of 670 m is on the left, and the middle section of 610 m is on the right.

Referring to the histogram of the normal distribution of an apparent resistivity according to the transient electromagnetic method of the tunnel in the middle section of 670 m in FIG. 4, it can be seen that the apparent resistivity obeys a logarithmic normal distribution. Therefore, the upper limit of an abnormity is determined by subtracting 1 to 3 times the standard deviation from the median of the apparent resistivity. The median minus 1 time the standard deviation is 307 Ω·m, the median minus 2 times the standard deviation is 153 Ω·m, and the median minus 3 times the standard deviation is 76 Ω·m. The upper limit of the abnormity is determined to be 200 Ω·m by combining FIG. 4 with the observed electric potential abnormity and the known orebody abnormity.

Referring to the histogram of the normal distribution of an apparent resistivity according to the transient electromagnetic method of the tunnel in the middle section of 610 m in FIG. 4, it can be seen that the apparent resistivity obeys the logarithmic normal distribution. Therefore, the upper limit of an abnormity is determined by subtracting 1 to 3 times the standard deviation from the median of the apparent resistivity. The median minus 1 time the standard deviation is 327 Ω·m, the median minus 2 times the standard deviation is 175 Ω·m, and the median minus 3 times the standard deviation is 93 Ω·m. The upper limit of the abnormity is determined to be 200 Ω·m by combining FIG. 4 with the observed electric potential abnormity and the known orebody abnormity.

In step (5), delineation of the apparent resistivity abnormity is carried out as follows.

Figure 5:
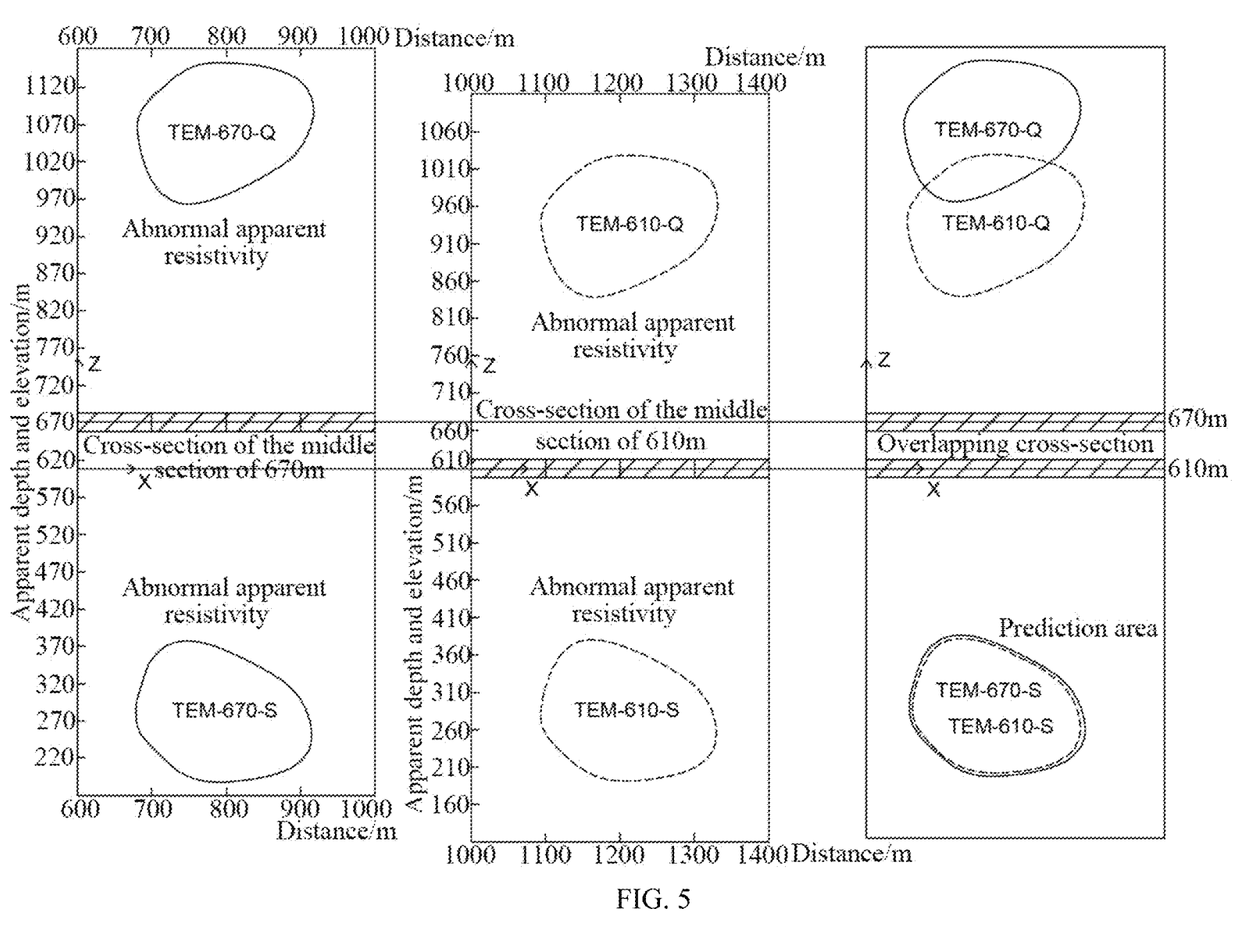
FIG. 5 is a schematic diagram of positioning low-resistivity orebody in (Transient electromagnetic method) TEM abnormal areas of a double-tunnel section at middle sections of 670 m and 610 m of a lead-zinc mineral deposit in northeast Yunnan, in which two graphs in the left column are the cross-sectional views of the tunnel in the middle section of 670 m, two graphs in the middle column are the cross-sectional views of the tunnel in the middle section of 610 m, and two graphs in the right column are overlapping schematic diagrams of the cross-sectional views of the two tunnel.

According to the upper limit of the apparent resistivity abnormity determined in step (4), the apparent resistivity abnormities of the cross section and the plane of the tunnel in the middle section of 670 m and 610 m are delineated (FIG. 5).

In step (6), positioning and predicting concealed orebody are carried out as follows.

Figure 6:
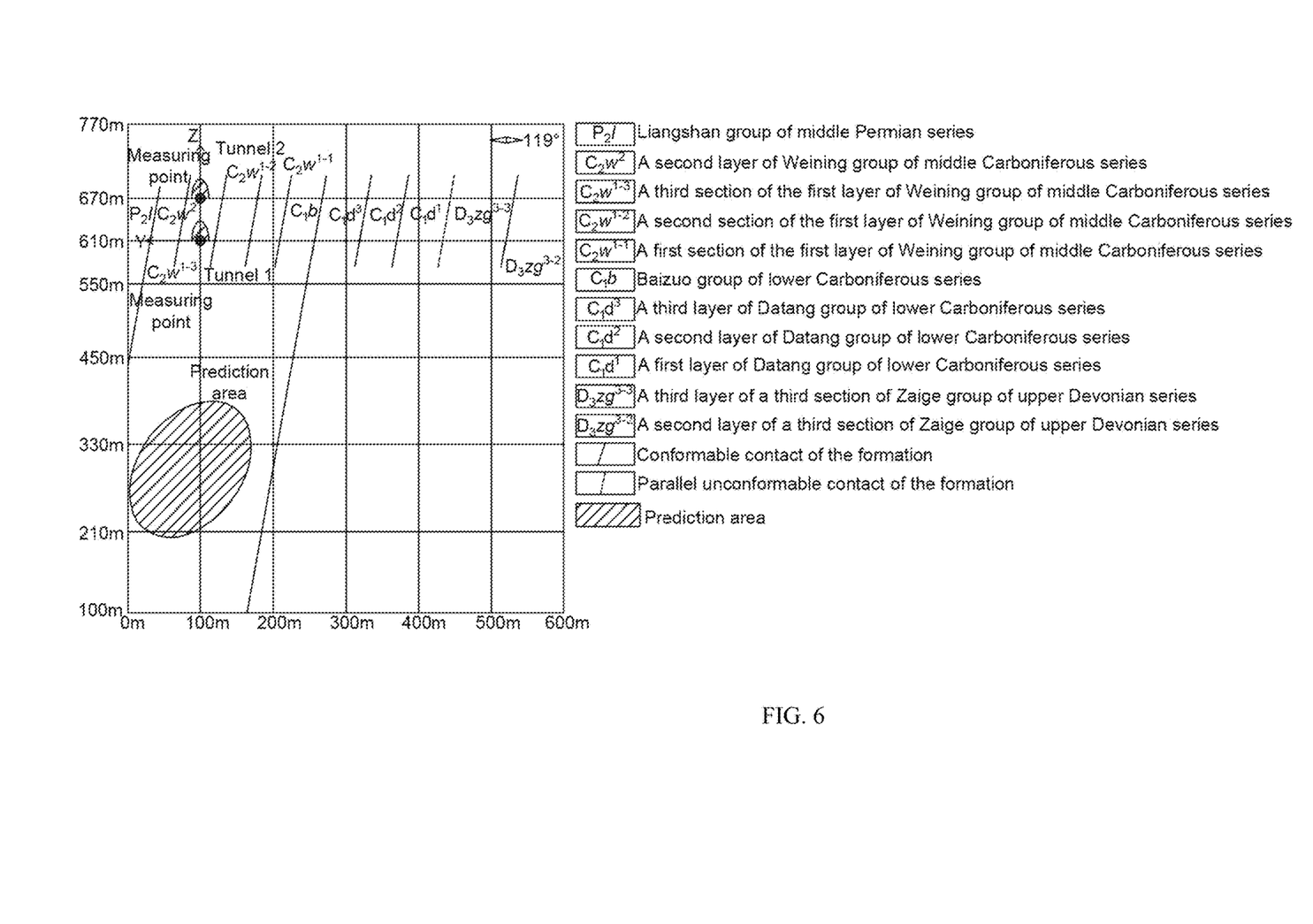
FIG. 6 is a cross-sectional view of a concealed orebody predicted by using a parallel double-tunnel transient electromagnetic method in a lead-zinc mineral deposit in northeast Yunnan.

For the apparent resistivity in a single tunnel, there are two longitudinally symmetrical apparent resistivity abnormities. Two apparent resistivity abnormities, which are symmetrical to each other up and down, of the tunnel in the middle section of 670 m are TEM-670-Q and TEM-670-S, and two apparent resistivity abnormities, which are symmetrical to each other up and down, of the tunnel in the middle section of 610 m are TEM-610-Q and TEM-610-S. According to the up-and-down correspondence relationship between the two tunnels, the apparent resistivity abnormities of the two tunnels are overlapped on the section, and the overlapped range of the apparent resistivity abnormities of the low-resistivity orebody under the tunnel in the middle section of 610 m is determined as the prediction area, namely TEM-670-S and TEM-610-S (FIG. 5). The prediction area is located in the ore-hosted formation of Carboniferous Weining Formation ($C_2w$) and Baizuo Formation ($C_1b$), and the center position is located in the ore-hosting formation of $C_2w^{1-3}$ with 370 m~200 m, the dip direction in the northwest (NW), and the plunge in the northeast (NE) (FIG. 6).

The position of the concealed orebody predicted by this method is generally consistent with the verification results of drilling engineering, which shows that the method is feasible.

What is claimed is:

1. A method for positioning and predicting concealed orebody based on parallel double-tunnel transient electromagnetic exploration, comprising following steps:

step (1), measuring electrical parameters of ores and ore-hosted rocks in a mining area, calculating a geometric mean of a resistivity, and determining that an orebody is a low-resistance element with respect to a surrounding rock, step (2), defining a forward direction of a tunnel as a positive direction of an X-axis, an upward direction normal to the X-axis as a positive direction of a Z-axis, and a direction normal to the X-axis and normal to the Z-axis as a positive direction of a Y-axis according to a right-hand rule; when two tunnels are parallel upper tunnel and lower tunnel, assuming that a distance between the two tunnels is c, and specifying a first measuring point of the lower tunnel as the origin O with an coordinate of (0,0,0); specifying a coordinate of a first measuring point of the upper tunnel as (0,0,c), wherein c is between 0 and 500 m; arranging tunnel transient electromagnetic measuring points along the tunnel for measurement, wherein a distance between the measuring points is 20 m; carrying out measurement by using a tape measure and a plan of a middle section of the tunnel for positioning the tunnel transient electromagnetic measuring points; carrying out measurement by using a coplanar equivalent counter-flux device to obtain data about electric potential observation value V(t), current I and time t, wherein a number of turns of a transmitting coil is 6, a radius of the transmitting coil is 0.42 m, power supply current is 100 A, sampling time is 0.17-10 ms, a number of superposition times is 30, and detection distance is 500 m; calculating an apparent resistivity as follows:

$$\rho_\tau = 0.00632 \times L^{\frac{4}{3}} \times q^{\frac{2}{3}} \times [V(t)/I]^{-\frac{2}{3}} \times t^{-\frac{5}{3}} \quad (1)$$

wherein L is a side length of the transmitting coil in unit of m;

q is an effective area of a receiving coil in unit of m², and the effective area of the receiving coil is equal to an area of a single-turn coil multiplied by a number of turns;

V(t) is the electric potential observation value in unit of μV;

V(t)/I is a normalized electric potential observation value in unit of μv/A;

t is an observation time in unit of ms;

$\rho_\tau$ is the apparent resistivity in unit of Ω·m;

carrying out an inversion calculation on a visual depth as follows:

$$h_\tau = 4/(\mu_0 S_\tau) \times \left( V(t)/\frac{dV}{dt} - t/4 \right) \quad (2)$$

$$S_\tau = \frac{16\pi^{1/3}}{(3Mq)^{1/3}\mu_0^{4/3}} \times (V(t))^{5/3} / \left(\frac{dV}{dt}\right)^{4/3} \quad (3)$$

wherein $\mu_0 = 4\pi \times 10^{-7}$ H/m;

$S_\tau$ is a longitudinal conductance in unit of 1/Ω;

V(t) is the electric potential observation value in unit of μV;

dV/dt is a derivative of an observation electric potential in unit of V/s;

t is an observation time in unit of ms;

M is a transmitting magnetic moment in unit of m²A;

q is an effective area of the receiving coil in unit of m², and the effective area of the receiving coil is equal to the area of the single-turn coil multiplied by the number of turns;

$h_\tau$ is the visual depth in unit of m;

obtaining the apparent resistivity according to a calculation result of Formula (1), then calculating and obtaining the visual depth according to Formula (2) and Formula (3), and drawing a cross-sectional view of resistivity-visual depth distribution according to the apparent resistivity and the visual depth;

step (3), determining an upper limit of an apparent resistivity abnormity;

through statistics of normal distribution of the apparent resistivity in tunnel transient electromagnetic measurement, obtaining a median and a standard deviation of the apparent resistivity, wherein the upper limit of the apparent resistivity abnormity is equal to the median of the apparent resistivity minus 1 to 3 times the standard deviation, or the upper limit of the apparent resistivity abnormality is equal to an average of the apparent resistivity minus 1 to 3 times the standard deviation;

step (4), delineating the apparent resistivity abnormity;

according to the upper limit of the apparent resistivity abnormity determined in step (3), delineating apparent resistivity abnormities of the two tunnels; wherein there are two areas with the apparent resistivity abnormity, which are axially symmetrically distributed with the tunnel transient electromagnetic measuring points;

step (5), positioning and predicting concealed orebody;

for the apparent resistivity abnormities delineated in step (4), forming a distribution map of four apparent resistivity abnormities of the two tunnels in X-O-Z plane according to a parallel correspondence relationship between vertical planes of the two tunnels, defining a part above the upper tunnel as an upper part, a part below the lower tunnel as a lower part, and a part between the two tunnels as a middle part; comparing coincidences of the four apparent resistivity abnormities of the two tunnels in the plane, and in a case that two apparent resistivity abnormities of the two tunnels overlap in a certain direction, determining that a prediction area is within an overlapping area; wherein in the X-O-Z plane, when the apparent resistivity abnormities of the two tunnels overlap in the upper part, the prediction area is located in the upper part; when the apparent resistivity abnormities of the two tunnels overlap in the lower part, the prediction area is located in the lower part; and when the apparent resistivity abnormities of the two tunnels overlap in the middle part, the prediction area is located in the middle part.

* * * * *